United States Patent

Fuwa

[15] 3,690,237
[45] Sept. 12, 1972

[54] ELECTRONIC FLASHLIGHT DEVICE FOR FLASHLIGHT PHOTOGRAPHY

[72] Inventor: Zydichi Fuwa, c/o Kabushiki Kaisha Ricoh 3-6, 1-chome, Naka Magome, Ohta-ku, Tokyo, Japan

[22] Filed: Sept. 22, 1970

[21] Appl. No.: 74,532

Related U.S. Application Data

[63] Continuation of Ser. No. 674,780, Oct. 12, 1967, abandoned.

[52] U.S. Cl. ................................. 95/11.5 R, 95/53 E
[51] Int. Cl. ...................... G03b 15/05, H05b 41/00
[58] Field of Search....95/11.5 R, 53 E, 53 R, 53 EA, 95/53 EB; 240/1.3

[56] References Cited

UNITED STATES PATENTS

| | | | |
|---|---|---|---|
| 2,755,714 | 7/1956 | Germeshausen | 95/11.5 R |
| 3,418,904 | 12/1968 | Wick et al. | 95/11.5 R |
| 3,288,044 | 11/1966 | Bramer | 95/11.5 R |
| 3,521,540 | 7/1970 | Cavallo | 95/11.5 R |
| 3,424,071 | 1/1969 | Schwahn | 95/11.5 R |
| 3,465,656 | 9/1969 | Wick et al. | 95/11.5 R |

*Primary Examiner*—Samuel S. Matthews
*Assistant Examiner*—Robert P. Greiner
*Attorney*—Burgess, Ryan & Hicks

[57] ABSTRACT

A device particularly for use with a camera having an electronic flash and a shutter but no diaphragm control so that the flash will be produced at some time before the shutter has completely opened. In order to regulate the light passing through the shutter, in one embodiment a switch is closed when the shutter begins to open to permit a capacitor to discharge through a variable resistor until its voltage reaches a point where two transistors are switched to produce a signal which enables the capacitor to discharge through a discharge tube which then produces an electronic flash. In a second embodiment, when the switch is open, a capacitor begins to charge through a variable resistor and when the capacitor has charged to a given level, a transistor switching circuit is triggered to apply a trigger signal to the flash tube.

3 Claims, 6 Drawing Figures

PATENTED SEP 12 1972

ELECTRONIC FLASHLIGHT DEVICE FOR FLASHLIGHT PHOTOGRAPHY

This is a continuation of application Ser. No. 674,780 filed Oct. 12, 1967 and now abandoned.

This invention relates to an electronic flashlight device to be used for flashlight photography.

Recently, a type of camera having an automatic exposure control device, that is, so-called E. E. type camera has been widely used, and in this type of camera, when a photograph is taken, the diaphragm aperture is automatically regulated against the shutter timer which has been determined beforehand.

On the other hand, in cameras having an electric shutter which are also widely used in these days, the shutter speed is automatically regulated against the brightness of the object. However, of these electric shutter cameras, there are some which do not have any aperture regulating device at all.

When flashlight photography is wanted utilizing on E.E. type camera, the aperture control is turned to a manual control position and adjusted to an appropriate value calculated from the guide number of the flashlight tube. However, if an E.E. type camera having no aperture control is employed, the exposure adjustment required for strobolight photography cannot be obtained. For this reason, it was a general conception that strobolight photography with a camera having no aperture control was not possible.

In such case, if the flashlight tube is of the type wherein the duration time is long enough, as in the case of the flash bulb (about 20 msec.), there is a possibility of obtaining the desired exposure by suitably selecting the closing time position of the electric shutter within the duration time of the flashlight tube. This, however, is not possible if the flashlight is the discharge tube type, wherein the duration time is extremely short (about 300 – 500 $\mu$sec.).

Accordingly, the object of the present invention is to overcome the above described difficulties in the camera having an electric shutter, but not having any aperture control mechanism, and, according to the present invention, there is provided a delayed pulse generating device of simple construction which comprises a CR time constant circuit, a switching circuit, a pulse boosting transformer, etc. integrally contained in the conventional discharge tube type flashlight device. With this device, the delay time of the discharge tube in respect of the flashing time can be controlled in correspondence with the variation of the shutter aperture, and the strobolight photography is thereby possible with the type of camera having no aperture control as in the case of "between the lenses" type electrical shutter.

The invention will be better understood from the following description of the embodiments taken in conjunction with the accompanying drawing, in which.

Figure 1:
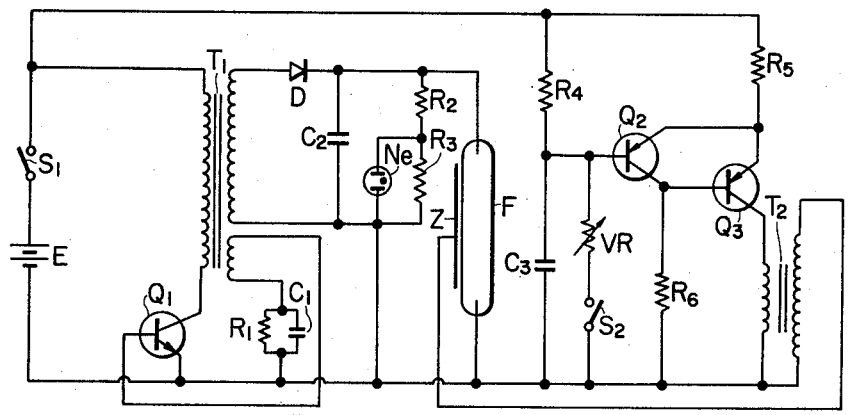
FIG. 1 illustrates an example of electrical circuit of the device according to the present invention.

Referring at first to FIG. 1, a power source battery designated by a symbol E furnishes power to an oscillation booster transformer T1 through a main switch S1, and the high tension power obtained from the transformer T1 is applied to a flashlight discharge tube F. In this case, the primary winding and one of the secondary winding of the transformer T1, a capacitor C1, a resistor R1, and a transistor Q1 altogether constitute a well known oscillation circuit, and the oscillation voltage is boosted by the transformer T1. The high tension voltage obtained at the output of the other secondary winding of the transformer T1 is rectified by a rectifier D and charges a capacitor C2 the DC high voltage thus obtained is applied between the anode and cathode of the discharge tube F. A neon tube Ne connected at the junction of the resistors R2 and R3 and, when lit, indicates existence of a high tension voltage at the discharge tube terminals sufficient to fire the tube. The above described battery also furnishes power to a CR time constant circuit and to a switching circuit. The switching circuit includes transistors Q2 and Q3, and the base of the transistor Q2 is connected to a junction point of a capacitor C3 and a resistor R4 connected in series with the power source battery E. Across the capacitor C3, a variable resistor VR and a switch S2 are connected in parallel altogether constituting a CR delay circuit. The collector of the transistor Q3 forming one part of the switching circuit is connected to the primary winding of another booster transformer T2, and the secondary winding of the same transformer is connected to the trigger electrode Z of the discharge tube F. Two resistors R5, and R6 connected with the emitter of the transistor Q3 and the collector of the transistor Q2 respectively are provided for obtaining feed-back from the transistor Q3 to Q2, and a switching circuit is thereby obtained. The switch S2 connected in series with the variable resistor VR in the above described CR time delay circuit is so designed that it is closed simultaneously with the start of the opening operation of the electric shutter blades (not shown) as indicated in FIG. 2.

Figure 2:
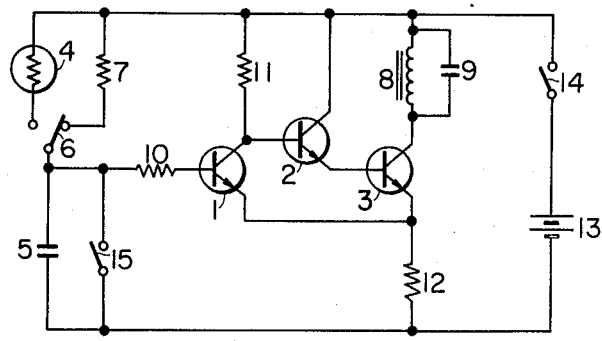
FIG. 2 is a circuit diagram of an electrical shutter camera to which the present invention is applied.

In FIG. 2, there is indicated an electric shutter circuit, which is in itself already known, but is novel in the manner that the above described electronic flashlight device in accordance with the present invention is applied thereto. In the drawing, transistors 1, 2, 3 constitute a switching circuit, and the base circuit of the transistor 1 includes a photo-conductive element 4 and a capacitor 5 which are connected, in the normal operation of the camera, through a transfer switch 6. A fixed resistor 7 is also provided in parallel with the photo-conductive element 4, and when the flashlight operation of the camera is desired, the transfer switch 6 is turned to this fixed resistor side. In the collector circuit of the transistor 3, an electromagnet 8 to control the rear blades (not shown) of this electric shutter and a capacitor 9 are connected in parallel. The resistors 10, 11, and 12 are so disposed as to operate the transistors in a switching mode. The numeral 13 designates a power source battery for the electric shutter circuit, the numeral 14 designates the main switch, and the numeral 15 designates a discharge switch of the capacitor 5.

Now, the operation of the electronic flashlight device according to this invention will be explained. At first, the transfer switch 6 in the electric shutter circuit shown in FIG. 2 is transferred to the fixed resistor 7 side and simultaneously the main switch S1 of the electronic flashlight device in accordance with this invention (FIG. 1) is closed. Closing of the main switch S1 will start charging of the capacitor C2 and a charging current to the capacitor C3 in the base circuit of transistor Q2 will flow through the resistor R4. During the time when the charging current for the capacitor C3 is flowing, the transistor Q2 is kept in ON state and the transistor Q3 is kept in OFF condition. But when the charging of the capacitor C3 comes nearly to the end, the voltage drop in the resistor R4 is decreased less than a predetermined value, and the circuit is switched over to a new condition wherein the transistor Q2 is OFF and the Q3 will be ON. Each time the transistors are switched over to new condition, a trigger pulse is applied to the discharge tube F. However, if it is so arranged that the trigger pulse is applied to tube F before the terminal voltage of the capacitor C2 is high enough, then the discharge of the tube F is not initiated in this condition. However, if it is confirmed that the terminal voltage of the capacitor C2 goes up high enough and the neon lamp Ne is lit, the shutter may be released and the switch S2 is closed simultaneous with the opening of the forward shutter blades. This causes the capacitor C3 to be discharged through the variable resistor VR, and after a certain time, a current flows through the base circuit of the transistor Q2. By this way, the circuit consisting of the transistors Q2 and Q3 is switched over, and the trigger pulse is applied to the discharge tube F. The delay period starting from the time switch S2 is closed until the time the discharge tube F glows can be varied by adjusting the variable resistor VR, and the amount can be determined with respect to the distance from the camera to the object. Accordingly, if the variable resistor in the CR time constant circuit comprising the capacitor C3, the variable resistor VR, and the switch S2 is varied depending on the distance of the object, the switch S2 is closed simultaneous with the opening of the shutter blades, and the time interval $t$ counted from the shutter is released to the time position where the transistors Q2 and Q3 are switched over can be varied. Since the switch S2 is closed at the same instant when the shutter starts opening, said time period $t$ is equal to the length of time starting from the shutter opening to the time the trigger pulse is delivered, and because the trigger pulse is applied to the trigger electrode Z, the time period $t$ can be considered equal to the delay time counted from the shutter opening to the time when the discharge tube F flashes.

Figure 3:
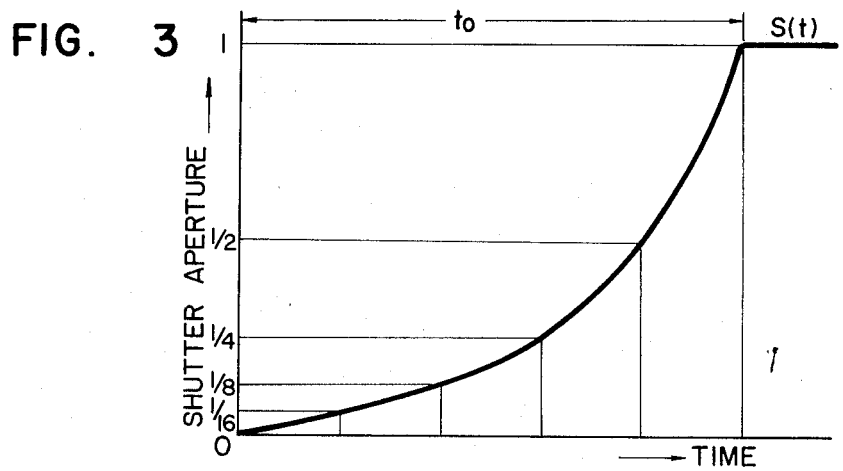
FIG. 3 is a graphical representation of the variation of the shutter aperture, with the time and the shutter aperture taken along the horizontal and vertical axis respectively.
Figure 4:
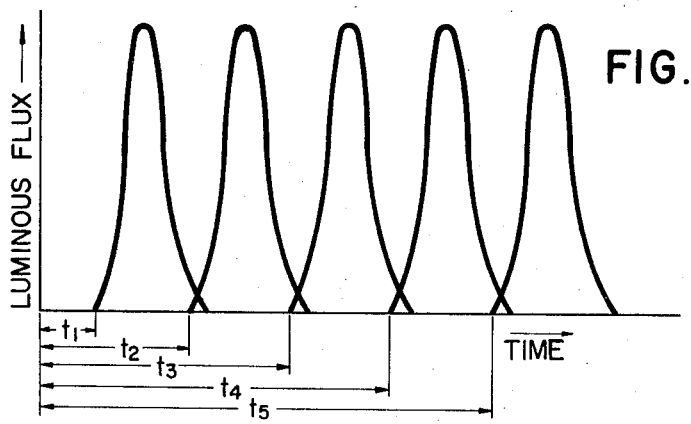
FIG. 4 is another graphical representation of the luminous fluxes generated from the flashlight discharge tube with respect to the time as indicated in FIG. 3 along the horizontal axis.

These relations will be explained in more details with reference to FIGS. 3 and 4. FIG. 3 illustrates the variation of the opening amount of the shutter aperture, and the time is taken on its horizontal axis. When said delay time is set in correspondence with these time positions indicated along the horizontal axis of FIG. 3, the peak value of the flashlight emitted from the discharge tube F will be obtained at any of these time positions corresponding to the shutter apertures of 1, one-half, one-fourth, . . . To be more particular, when a flashlight photograph is to be taken at a shutter aperture of one-sixteenth, the variable resistor VR is set to the delay time equal to $t1$, and the trigger pulse will be applied to the discharge tube F at the $t1$ time after the switch S2 is closed, whereby the peak of the flashlight is obtained at the time position corresponding to the shutter aperture of one-sixteenth in FIG. 3. Thus determining set position of the variable resistor VR as $t2$, $t3$, $t4$, . . . , the peak value of the flashlight will be obtained at the instants of shutter aperture corresponding to one-eighth, one-fourth, one-half, 1. As an alternative, relating these time positions $t1$, $t2$, $t3$, . . . to the distance ratios of the object such as 1, $\sqrt{2}$, 2, 2 $\sqrt{2}$, 4, . . . , a constant exposure for an object located at various distances can be obtained.

Figure 5:
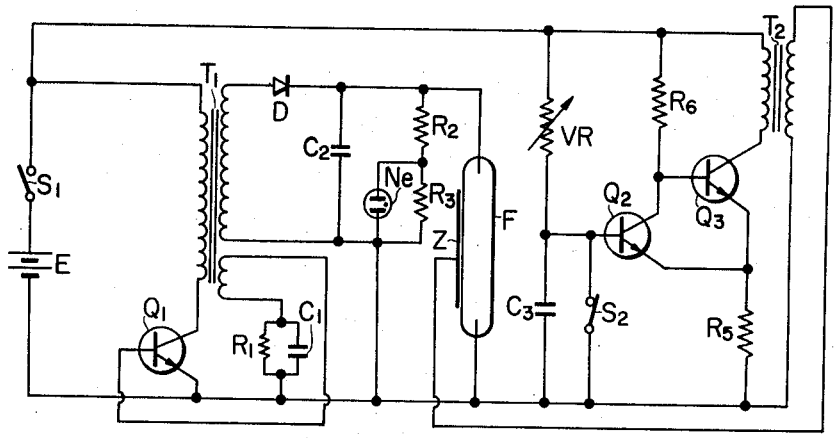
FIG. 5 is circuit diagram of another embodiment of the present invention.

In another case where a normally closed switch is used for the switch S2, that is, of just the reverse sense of the "X" synchronization contact, another embodiment of the electrical circuit as shown in FIG. 5 is utilized. In this embodiment, NPN type transistors are used for the Q2 and Q3, and the variable resistor VR is connected in place of said R4. The CR time constant in this case is formed by the capacitor C3 and the variable resistor VR connected in series.

Figure 6:
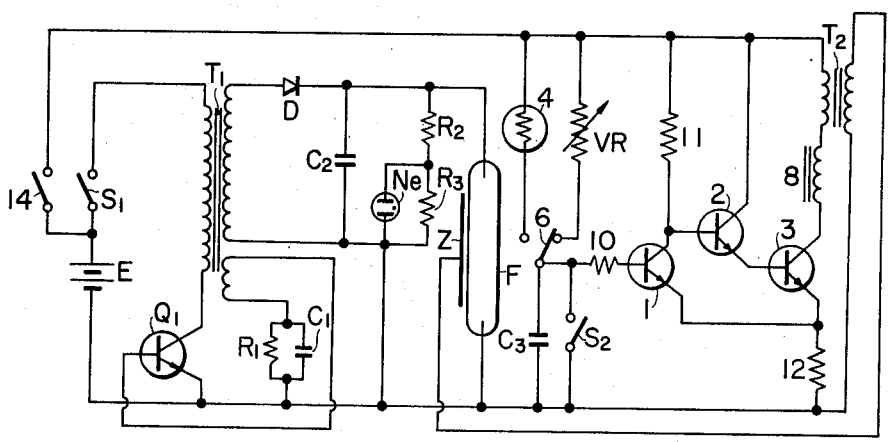
FIG. 6 is a circuit diagram of the case wherein the flashlight device in accordance with the present invention is accomodated in the electrical lens shutter camera.

Furthermore, if the electronic flashlight in accordance with the present invention is desired to be contained in the camera having said between the lens type shutter, the switching circuit for the electrical shutter and the time delay pulse generating circuit may be commonly provided. In this case, as shown in FIG. 6, the switch 6 is at first thrown to the flashlight operation side terminal, then throwing the main switch S1 to the closed position, the capacitor C2 is charged to a high voltage, and the shutter is thereafter released. At the time the shutter is released, a switch 14 cooperating with the shutter release rod is closed, and at the same time the shutter blades are opened or even a little earlier, the switch S2 is opened. As this result, the capacitor C3 is charged through the variable resistor VR, and after a certain time related to the distance of the object has passed, the circuit is switched and the trigger pulse is generated and the discharge tube F flashes. At this time, the electromagnet 8 which is keeping the shutter blades in its opened condition will also be turned off. However, due to the delay time (about 3 to 4 m.sec.) of the attracted piece of the electromagnet 8 in its mechanical movement, the blades are not closed instantaneously but be closed after a suitable flashlight exposure has been obtained on the film surface, and a correct flashlight photography is thereby obtained.

The variable resistor VR in said CR time constant circuit may be interlinked with the range ring of the camera, and furthermore, the aperture $S(t)$ in FIG. 3 illustrates for the case where the shutter blades are movable in free, and the time period $t$ corresponds to the instant when the maximum speed (about 2 msec.) of the shutter blades is attained. For the purpose of increasing precision in the exposure control of the flashlight, a simple governor can be placed only while the flashlight photograph is taken at this time period $t$ so that the time may be extended a little more. Or, in the above embodiment, for the purpose of controlling the flashlight ignition time, the time positions of the shutter blades while they are opening are utilized. However, it is of course possible that the closing period of the shutter blades is used for this purpose, and in such case, the switch S2 should be so constructed that it is closed when the shutter blades start to close. Furthermore, the shutter is so arranged that, when the switch 6 in FIG. 2 is thrown to the flashlight operation side, the shutter is closed within a short interval of time and the harmful effects from the hand release of the shutter or from any surrounding light can be thereby eliminated.

As described above, according to the present invention, not only the strobolight (electronic flashlight) photography can be easily attained even in a camera utilizing an electric shutter without having any aperture control mechanism as described in the earlier part of this specification, but also the flashlight ignition time of the discharge tube can be controlled by providing a delayed pulse generating device comprising a CR time constant circuit and switching circuit in the camera having a type of shutter, wherein the shutter speed is controlled by a mechanical governor accommodating this electronic flashlight device.

I claim:

1. Apparatus for use with a camera of the type operating with a shutter only comprising:

a discharge tube for producing a light flash for photography, means for causing said tube to produce said light flash including a capacitor, means to charge said capacitor and means for discharging said capacitor through said discharge tube when an electrical signal is applied to said discharging means, switch means for shifting from an open to a closed electrical condition when said shutter is opened, and variable delay means electrically connected to said causing means and to said switch means for producing said electrical signal a variable time after said switch means shifts from said open to said closed condition, said variable time being selected to operate when said shutter reaches a preset opening, said signal being applied to said causing means so that said tube thereafter produces said flash, wherein said delay means includes a second capacitor, means for charging said second capacitor, a variable resistor connected across said second capacitor via said switch means so that said capacitor discharges through said variable resistor, at a rate determined by the resistance of said variable resistor, when said switch means is closed, wherein said discharging means includes a first transistor electrically connected to said second capacitor, a second transistor connected to said first transistor so that said second transistor shifts from a first to a second electrical condition when said second capacitor discharges to a given level and electrical trigger means connected to said second transistor for applying a trigger signal to said flash tube when said second transistor shifts to said second condition so that the first capacitor discharges through said tube to produce said light flash at a time after said switch means was closed determined by the resistance of said variable resistance.

2. Apparatus as in claim 1 including a neon light connected to said first capacitor for indicating when said capacitor is charged to a level sufficient to cause said tube to produce said flash.

3. Apparatus for use with a camera of the type operating with only a shutter comprising:

a discharge tube for producing a light flash for photography, means for causing said flash means to produce said light flash, including a capacitor, means to charge said capacitor and means for discharging said capacitor through said discharge tube when an electrical signal is applied to said discharging means, switch means for shifting from a closed to an open electrical condition when said shutter is opened, and variable delay means electrically connected to said causing means and to said switch means for producing said electrical signal a variable time after said switch means shifts from said closed to said open condition, said variable time being selected to operate when said shutter reaches a preset opening, said signal being applied to said causing means so that said flash means thereafter produces said flash, wherein said delay means includes a second capacitor, means for charging said second capacitor, a variable resistor connected in series with said second capacitor with said switch means connected in parallel with said second capacitor so that said capacitor charges through said variable resistor, at a rate determined by the resistance of said variable resistor, when said switch means is open, wherein said discharging means includes a first transistor electrically connected to said second capacitor, a second transistor connected to said first transistor so that said second transistor shifts from a first to a second electrical condition when said second capacitor charges to a given level and electrical trigger means connected to said second transistor for applying a trigger signal to said flash tube when said second transistor shifts to said second condition so that the first capacitor discharges through said tube to produce said light flash at a time after said switch means was opened determined by the resistance of said variable resistance.

* * * * *